United States Patent [19]

Kim

[11] Patent Number: 5,213,894
[45] Date of Patent: May 25, 1993

[54] RED PIGMENT COATED PHOSPHOR AND PROCESS FOR MANUFACTURING SAID PHOSPHOR

[75] Inventor: Ung-su Kim, Suwon, Rep. of Korea

[73] Assignee: Samsung Electron Devices Co., Ltd., Kyunggi, Rep. of Korea

[21] Appl. No.: 630,058

[22] Filed: Dec. 19, 1990

[30] Foreign Application Priority Data

Dec. 22, 1989 [KR] Rep. of Korea .................... 89-19199

[51] Int. Cl.$^5$ .............................................. B32B 5/16
[52] U.S. Cl. ............................ 428/403; 252/301.4 S; 252/301.6 R; 252/301.36; 313/463; 313/467; 313/468; 427/68; 427/71; 427/73; 427/157; 427/201; 427/220; 427/372.2; 428/407; 428/690; 428/917
[58] Field of Search ............... 428/402, 403, 404, 407, 428/328, 329, 690, 917; 427/64, 68, 71, 73, 157, 201, 218, 220, 372.2; 313/364, 461, 463, 467, 468; 252/301.4 S, 301.4 P, 301.6 R, 301.6 S, 301.36

[56] References Cited

U.S. PATENT DOCUMENTS

| | | | |
|---|---|---|---|
| 3,886,394 | 5/1975 | Lipp | 427/68 X |
| 4,152,483 | 5/1979 | Kanda et al. | 428/407 |
| 4,219,587 | 8/1980 | Oba et al. | 428/407 |
| 4,568,635 | 2/1986 | Yamagami et al. | 430/505 |
| 4,684,540 | 8/1987 | Schulze | 427/71 |
| 4,853,254 | 8/1989 | Wolfe | 427/68 |

*Primary Examiner*—Paul J. Thibodeau
*Assistant Examiner*—Hoa T. Le
*Attorney, Agent, or Firm*—Cushman, Darby & Cushman

[57] ABSTRACT

A red pigment coated phosphor comprises a phosphor for color cathode ray tube and red pigment attached to said phosphor by an organic binder, wherein said organic binder is gellatin and casein. A process for preparation of a red pigment coated phosphor comprises the steps of: preparing three dispersions of red phosphor particles, red pigment particles and organic binder, respectively; uniformly mixing said three dispersions and agitating them sufficiently; adjusting pH of the mixture obtained; and adding a curing agent thereto, washing said mixture and then drying it. The red pigment coated phosphor of the present invention has a good dispersion and a good affinity for phosphor slurry.

9 Claims, 2 Drawing Sheets

FIG. IA
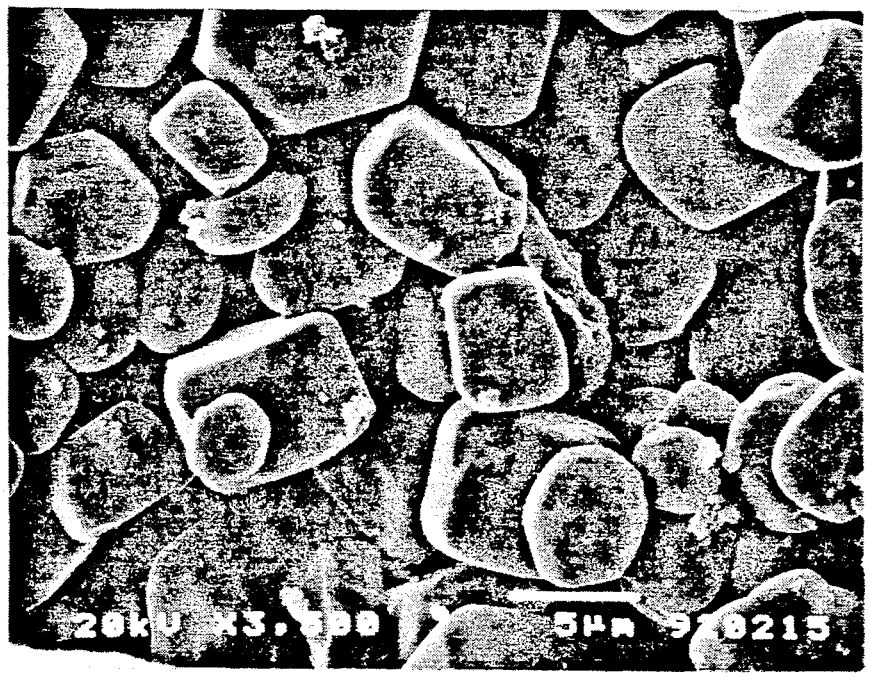
FIG. IB
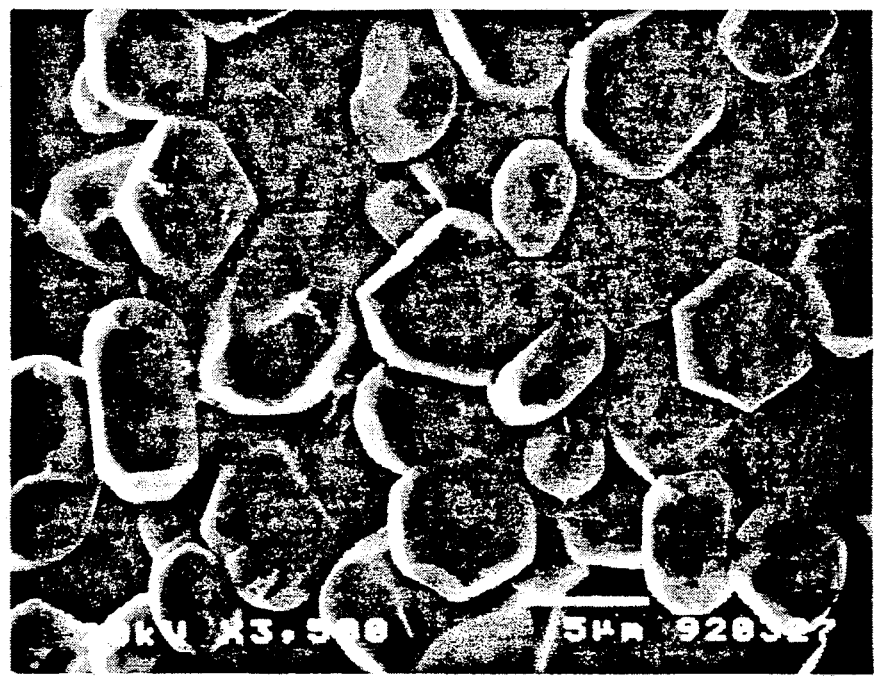

RED PIGMENT COATED PHOSPHOR AND PROCESS FOR MANUFACTURING SAID PHOSPHOR

FIELD OF THE INVENTION

The present invention relates to a red pigment coated phosphor employed in manufacturing a luminescent screen of a color cathode ray tube and a process for manufacturing said phosphor. More particularly, the present invention relates to a red pigment coated phosphor having high contrast in which the pigment having good affinity for a phosphor slurry and good dispersion is used, and a process for manufacturing said phosphor.

BACKGROUND OF THE INVENTION

Generally, adhesion of pigment particles of red, green and blue color to the respective surfaces of the corresponding red, green and blue phosphors employed in manufacturing a luminescent screen of a color cathode ray tube results in a clearer emission color, since a light having undesired wavelength within the emission spectra is absorbed or attenuated due to the filter effect of these pigment particles adhering thereto.

Luminescent screen formed by adding these pigments enhances the absorption of incident external light by the pigment coloration so as to reduce the reflectance of light from a luminescent screen, and therefore the contrast of the image is enhanced highly. $\alpha\text{-}Fe_2O_3$ is used widely as red pigment. Methods for coating a pigment in pigment coated phosphor which coats a pigment particle on the surface of a phosphor particle are as follows. (see U.S. Pat. No. 3,275,466 and U.S. Pat. No. 4,152,483)

1st method comprises the steps of (1) dispersing pigment particles into an aqueous solution of a resin such as polyvinyl pyrrolidone (PVP), (2) dispersing phosphor particles into a gelatin solution, (3) mixing the above two dispersions and stirring them thoroughly and (4) drying the resulting precipitates.

2nd method uses an acidic polymer and a basic polymer, which are water-soluble, instead of said PVP and gelatin.

3rd method comprises the steps of (1) preparing an aqueous solution of gelatin and an aqueous solution of gum arabic and homogeneously dispersing a phosphor into one of these aqueous solutions, (2) homogeneously dispersing pigment particles into the other solution and (3) mixing the two dispersions.

When a pigment coated phosphor is manufactured by said method, it tends to cause the flocculation during adhesion of pigment and the dispersion and affinity for a phosphor slurry is bad, and thus, this is disadvantageous in that all the characteristics is deteriorated if a luminescent screen of stripe or dot pattern is formed on the inner surface of the panel.

In this respect, the pigment coated phosphor has to meet the following conditions in order to have an excellent contrast:

1) the adhesion between the pigment particle and the phosphor particle should be strong, so that there should be no detachment of the pigment particle from the surface of the phosphor during dispersing in the slurry;

2) the pigment particles should be uniformly spread on the surfaces of the phosphor particles, and the flocculation of the phosphor particles should be negligible;

3) the pigment particles should be volatile and dispersed to have no foreign material when the material to coat said pigment particles is baked during the formation of a luminescent screen.

SUMMARY OF THE INVENTION

It is an object of the present invention to provide a red pigment coated phosphor having high contrast and excellent luminance characteristics which is obtained by removing the flocculation of the phosphor particles and improving the adhering force of pigment.

It is another object of the present invention to provide a process for manufacturing the red pigment coated phosphor described in the first object.

To accomplish the objects, there is provided a red pigment coated phosphor comprising a phosphor for color cathode ray tube and red pigment attached to the phosphor by an organic binder, wherein said organic binder is gelatin and casein.

A process for preparation of a red pigment coated phosphor according to the present invention comprises the steps of:

preparing a dispersion of red phosphor particles, a dispersion of red pigment particles and a dispersion of organic binders;

uniformly mixing said three dispersions and agitating them sufficiently;

adjusting pH of the mixture obtained; and adding a curing agent thereto, washing said mixture and then drying it.

Red phosphors used in preparing a red pigment coated phosphor according to the present invention include $Y_2O_2S:Eu$ phosphor, $Y_2O_3:Eu$ phosphor and $YVO_4:Eu$ phosphor and red pigments used in the present invention include $Fe_2O_3$, $Pb_2O_3$ and $(Cd, Se)S$, and organic binder includes gelatin and casein.

BRIEF DESCRIPTION OF THE DRAWINGS

The above object and other advantage of the present invention will become more apparent by describing in detail the preferred examples of the present invention with reference to the attached drawings in which:

FIG. 1A is an enlarged photograph of a conventional red pigment coated phosphor measured by a microscope with 3200 magnifications;

FIG. 1B is an enlarged photograph of a phosphor according to the present invention

DESCRIPTION OF THE PREFERRED EMBODIMENTS

Figure 2:
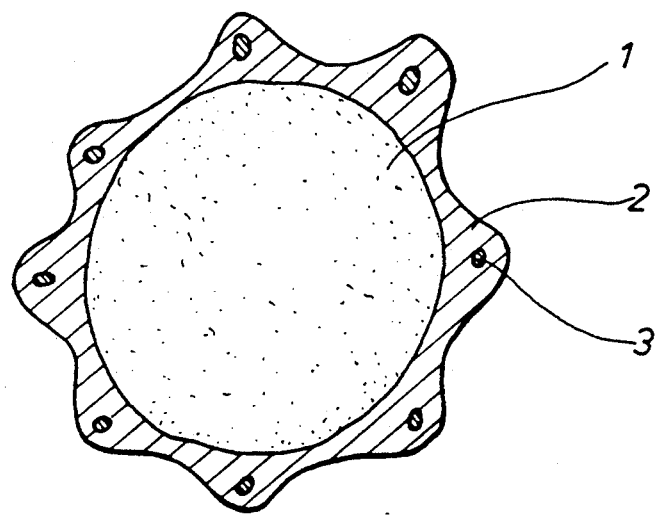
FIG. 2 is a cross-sectional view of red pigment coated phosphor according to the present invention. The amount of the red pigment particles used in the present invention is 0.01 to 2 parts by weight based on 100 parts by weight of said phosphor. The amount of the gelatin used as an organic binder is 0.01 to 2 part by weight based on 100 parts by weight of said phosphor, and the amount of the casein used as an organic binder is 0.01 to 2 part by weight based on 100 parts by weight of said phosphor. The amount of formaldehyde, which is a curing agent is 0.1 to 2 parts by weight based on 100 parts by weight of said phosphor.

The preferred examples of the present invention will be described in detail and the phosphor of the present invention is not limited.

EXAMPLE 1

500 ml of pure water was poured into a 3-liter beaker and 300 g of $Y_2O_2S:Eu$ phosphor was dispersed therein and then, was stirred for 60 minute to prepare a Y$_2$O$_2$S:Eu phosphor dispersion. 0.16 part by weight of Fe$_2$O$_3$ pigment based on 100 parts by weight of said phosphor was pulverized for 6 hours by a ball mill and was dispersed in pure water to give a pigment dispersion.

The amounts of gelatin and casein, which are an organic binder, were 0.1 part by weight based on 100 parts by weight of said phosphor, respectively. Aqueous gelatin solution was prepared by dissolving gelatin in pure water of 65° C. Aqueous casein solution was prepared by dissolving casein in 20 ml of 1N-NaOH solution (because casein is insoluble).

A pigment dispersion, aqueous gelatin solution and aqueous casein solution were added together to said prepared phosphor dispersion, and then they were stirred for 20 minutes by stirrer to give a aqueous basic solution of pH 12.

5% acetic acid was added dropwise thereto to adjust pH of said basic solution to 7.0 and then the temperature of said basic solution was lowered to 5° C. 3 ml of formaldehyde was added to said solution, stirred for 30 minutes, and dispersed successively.

Finally, process such as washing, drying and sieving separation was carried out to give a red pigment coated phosphor according to the present invention.

EXAMPLE 2

The procedure was carried out in the same manner as that of Example 1, except that Fe$_2$O$_3$ was replaced with Pb$_2$O$_3$.

Thus, a red pigment coated phosphor according to the present invention was obtained.

EXAMPLE 3

The procedure was carried out in the same manner as that of Example 1, except that Fe$_2$O$_3$ was replaced with (Cd, Se)S. Thus, a red pigment coated phosphor according to the present invention was obtained. Flocculation of pigment particles, or of phosphor particles after coating pigment particles was not found in the red pigment coated phosphor thus obtained. The characteristics of a phosphor of the present invention and a conventional phosphor was compared and shown in Table 1.

TABLE 1

|  | emission intensity (%) | Leaving percentage of pigment particles | the number flocculation of pigment particles | organic binder used |
|---|---|---|---|---|
| conventional phopshor | 100 | 0.01 | 6 | gelatin + gum arabic |
| phosphor of the present invention | 104 to 105 | 0.02 to 0.03 | none | gelatin + casein |

*note: Data written in Table 1 are values obtained by measuring 5 times

As can be seen from Table 1, it was found that the emission intensity increases in 4%, a leaving percentage of pigment particles leaved from the surface of phosphor particles decreases as 5 times and flocculation phenomena of pigment particles are not accompanied.

FIG. 1 illustrates an enlarged photograph of a red pigment coated phosphor measured by a microscope with 3200 magnifications, and (a) shows a conventional phosphor, and (b) shows a phosphor according to the present invention.

As shown in FIG. 1, red pigment coated phosphors in which pigment particles are attached uniformly and strongly to the surface of phosphor particles without being accompanied by flocculation are obtained. The enhancement of quality of a luminescent screen can be expected in the manufacture of a luminescent screen of color cathode ray tube.

FIG. 2 shows a cross-sectional view of a red pigment coated phosphor according to the present invention, and (1) is a phosphor, (2) is coated film, and (3) is pigment.

The experiment for leaving percentage of pigment shown in Table 1 was carried out by the following method.

10 g of red pigment coated phosphors were put into a 100 cc-mass cylinder and 1 ml of 1N-HCl was added thereto and then, it was shaked violently for 10 minutes and was letted alone. Then, the number of pigments in a supernatant liquid was measured. The number of pigments flocculated on the surface of phosphor was counted by using a microscope with 50 magnifications.

As described above, in accordance with embodiments of the present invention, red pigment coated phosphor which was formed by using casein in place of gum arabic as binder was advantageous in that pigment particles were uniformly attached to the surface of phosphors without being accompanied by flocculation between phosphor particles and has a good dispersion and a good affinity for phosphor slurry. Thus, a luminescent screen had a high contrast.

What is claimed is:

1. A red pigment coated phosphor comprising a phosphor for color cathode ray tube, said red pigment being attached to said phosphor by an organic binder, wherein
    said organic binder consists of gelatin and casein, and wherein the amount of said organic binder is 0.01 to 2 part by weight based on 100 parts by weight of said red pigment coated phosphor and the amount of said red pigment particles is 0.01 to 2 part by weight based on 100 parts by weight of said red pigment coated phosphor.

2. The phosphor as claimed in claim 1, wherein said red pigment particle is selected from the group consisting of iron oxide (Fe$_2$O$_3$), lead oxide (Pb$_2$O$_3$) and cadmium selenium sulfide ((Cd, Se)S).

3. The phosphor as claimed in any one of claim 1 or claim 2, wherein said phosphor is selected from the group consisting of europium activated yttrium oxysulfide (Y$_2$O$_2$S:Eu) phosphor, europium activated yttrium oxide (Y$_2$O$_3$:Eu) phosphor and europium activated yttrium vanadate (YVO$_4$:Eu) phosphor.

4. A process for preparation of a red pigment coated phosphor, comprising the steps of:
    preparing a dispersion of red phosphor particles, a dispersion of red pigment particles and dispersions of organic binder wherein said binder consists of gelatin and casein, and wherein the amount of said organic binders is 0.01 to 2 parts by weight based on 100 parts by weight of said red pigment coated phosphor and the amount of said red pigment-particles is 0.01 to 2 parts by weight based on 100 parts by weight of said red pigment coated phosphor;
    uniformly mixing said four dispersions and agitating them until they are homogeneous;
    adjusting pH of the mixture obtained to maintain neutrality; and adding a curing agent thereto, washing and then drying said mixture.

5. The process as claimed in claim 4, wherein said organic binder consists of gelatin and casein.

6. The process as claimed in claim 4, wherein said red pigment particle is selected from the group consisting of iron oxide ($Fe_2O3$), lead oxide ($Pb_2O_3$) and cadmium selenium sulfide ($(Cd, Se)S$).

7. The process as claimed in any one of claim 4 to claim 6, wherein said phosphor is selected from the group consisting of europium activated yttrium oxysulfide ($Y_2O_2S:Eu$) phosphor, europium activated yttrium oxide ($Y_2O_3:Eu$) phosphor and europium activated yttrium vanadate ($YVO_4:Eu$) phosphor.

8. The process as claimed in claim 4, wherein said curing agent is a folmaldehyde.

9. The process as claimed in claim 4, wherein the pH of said mixture is adjusted to 6.8 to 7.0.

* * * * *